United States Patent
Paragaonkar et al.

(10) Patent No.: US 11,128,410 B1
(45) Date of Patent: Sep. 21, 2021

(54) HARDWARE-EFFICIENT SCHEDULING OF PACKETS ON DATA PATHS

(71) Applicant: Cadence Design Systems, Inc., San Jose, CA (US)

(72) Inventors: Chetan Paragaonkar, Bengaluru (IN); Gopi Krishnamurthy, Bengaluru (IN); Anish Mathew, Bengaluru (IN); Raveendra Pai Gopalakrishna, Bengaluru (IN); Anujan Varma, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/515,556

(22) Filed: Jul. 18, 2019

(51) Int. Cl.
*H04L 1/18* (2006.01)
*G06F 13/38* (2006.01)
*H04L 12/801* (2013.01)

(52) U.S. Cl.
CPC .......... *H04L 1/1854* (2013.01); *G06F 13/385* (2013.01); *H04L 1/188* (2013.01); *H04L 47/19* (2013.01); *G06F 2213/0026* (2013.01)

(58) Field of Classification Search
CPC ......... H04L 47/19; H04L 69/16; H04L 67/32; G06F 13/385; G06F 2213/0026
See application file for complete search history.

(56) References Cited

U.S. PATENT DOCUMENTS

| | | | |
|---|---|---|---|
| 7,583,600 B1* | 9/2009 | Schanke | H04L 1/1854 370/235 |
| 2005/0144339 A1* | 6/2005 | Wagh | H04L 69/32 710/36 |
| 2010/0042766 A1* | 2/2010 | Lai | G06F 13/4221 710/244 |
| 2011/0153875 A1* | 6/2011 | Khericha | G06F 13/28 710/22 |
| 2013/0179612 A1* | 7/2013 | Feekes | G06F 13/42 710/106 |

OTHER PUBLICATIONS

Husejko et al. "Practical Introduction to PCI Express with FPGAs" CERN Electronics Seminars Mar. 22, 2011 (Year: 2011).*
Aguilar et al. "Proposal of Implementation of the Data Link Layer of PCI-Express" 2004 International Conference on Electrical and Electronics Engineering (Year: 2004).*

* cited by examiner

*Primary Examiner* — Jeffrey M Rutkowski
*Assistant Examiner* — Basil Ma
(74) *Attorney, Agent, or Firm* — Vista IP Law Group, LLP

(57) ABSTRACT

Embodiments disclosed are directed to methods for scheduling packets. According to example embodiments the method includes receiving, using a first layer in a communication protocol, a first request from a second layer in the communication protocol. The first request indicates to the first layer to output a data stream that includes a first location for the second layer to include a first control packet. The first layer is at a higher level of abstraction than the second layer. The method further includes transmitting, using the first layer, a first response to the second layer. The first response is based on the first request, and the first response identifies the first location in the data stream and a time of occurrence of the first location in the data stream.

23 Claims, 8 Drawing Sheets

HARDWARE-EFFICIENT SCHEDULING OF PACKETS ON DATA PATHS

TECHNICAL FIELD

Embodiments described herein are generally related to packet scheduling in telecommunication or computing environments. More specifically, embodiments described herein are related to systems and methods for scheduling packets by scheduling higher-layer packets (e.g., packets pertaining to a higher layer of abstraction in the communication protocol (or standard)) on a data path to facilitate multiplexing of lower-layer packets (e.g., packets pertaining to the lower layers of abstraction in the communication protocol) in order to minimize shifting and/or realignment of the packets by the lower layers and to minimize backpressure from the lower layers.

BACKGROUND

In telecommunication or computing systems, a fast and flexible interconnect system is desirable to provide connectivity between devices for high levels of data throughput. In the communication protocol presently used, a lower layer introduces packets (data) in the data stream received from a higher layer and applies backpressure to the higher layer. This requires the incoming packets from the higher layer and/or the outgoing packet from the lower layer to be shifted and realigned to account for the newly introduced packets. This increases the complexity of the circuit (logic) and thus requires more hardware to implement. As the data packets to be processed in every processing cycle increases, the complexity of the circuit also increases. The increasingly complex circuit increases hardware cost, and the power consumption of the circuit.

The description provided in the background section should not be assumed to be prior art merely because it is mentioned in or associated with the background section. The background section may include information that describes one or more aspects of the subject technology.

SUMMARY

In a first embodiment, a method is described that includes receiving, using a first layer in a communication protocol, a first request from a second layer in the communication protocol, the first request indicating the first layer to output a data stream that includes a first location for the second layer to include a first control packet, and the first layer being at a higher level of abstraction than the second layer; and transmitting, using the first layer, a first response to the second layer, the first response being based on the first request, and the first response identifying the first location in the data stream and a time of occurrence of the first location in the data stream.

In a second embodiment, an assembly is described that includes a system including a first layer, a second layer, and a third layer, wherein the first, second, and third layers are different layers of abstraction of a communication protocol utilized by the system, the first layer includes a scheduling module, and first layer is at a higher level of abstraction than the second and third layers. The system includes a memory device storing instructions, and a processor communicably coupled to the system. The processor is configured to execute the instructions to direct the system to receive, using the scheduling module of the first layer, a first request from the second layer, the first request indicating the first layer to output a data stream that includes a first location for the second layer to include a first control packet, and transmit, using the scheduling module of the first layer, a first response to the second layer, the first response being based on the first request, and the first response identifying the first location in the data stream and a time of occurrence of the first location in the data stream.

In yet another embodiment, a non-transitory, computer-readable medium storing instructions is described. The instructions, when executed by a processor, direct the processor communicably connected to a system to perform a method. The system includes a first layer, a second layer, and a third layer, and the first layer includes a scheduling module. The method includes receiving, using the scheduling module, a first request from the second layer, the first request indicating to the first layer to output a data stream that includes a first location for the second layer to include a first control packet, wherein the first, second, and third layers are different layers of abstraction of a communication protocol used by the system, and first layer is the topmost layer in a plurality of abstraction layers in the communication protocol including the second and third layers, and transmitting, using the scheduling module, a first response to the second layer, the first response being based on the first request, and the first response identifying the first location in the data stream and a time of occurrence of the first location in the data stream.

In a further embodiment, a system is described that includes a means for receiving, using a first layer in a communication protocol, a first request from a second layer in the communication protocol, the first request indicating the first layer to output a data stream that includes a first location for the second layer to include a first control packet, and the first layer being at a higher level of abstraction than the second layer, and a means for transmitting, using the first layer, a first response to the second layer, the first response being based on the first request, and the first response identifying the first location in the data stream and a time of occurrence of the first location in the data stream.

BRIEF DESCRIPTION OF THE DRAWINGS

The accompanying drawings, which are included to provide further understanding and are incorporated in and constitute a part of this specification, illustrate disclosed embodiments and together with the description serves to explain the principles of the disclosed embodiments. In the drawings.

DETAILED DESCRIPTION

Figure 1:
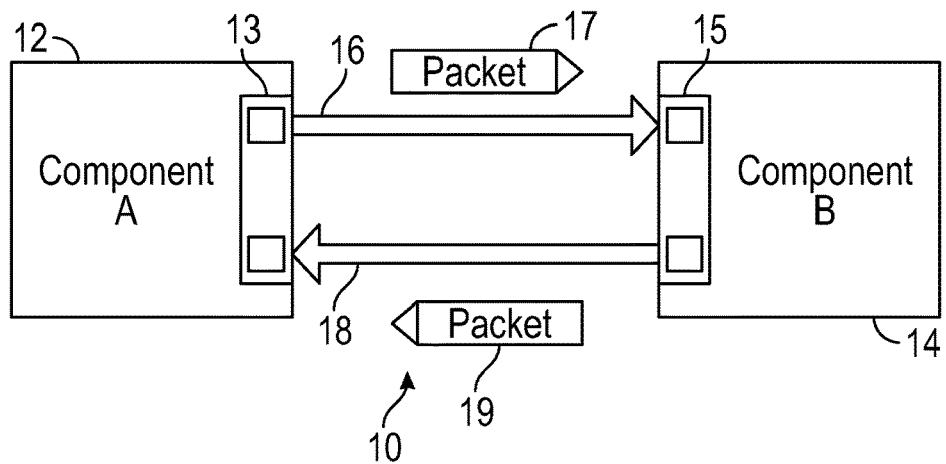
FIG. 1 illustrates an example communications channel.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Example embodiments are directed to systems and methods for scheduling packets in communication or computing devices to minimize the shifting and/or realignment of packets in a data stream. In order to minimize the shifting and/or realignment of packets, one or more lower layers of the communication standard communicate their bandwidth requirements to the higher layer(s) using a request-response protocol, and the higher layer(s) schedule and align the packet transmitted to the lower layers such that the need to shift and realign packets in the downstream data is limited. In some embodiments, on demand, the higher layer introduces (or otherwise schedules) gaps or idle cycles or similar in the data stream for inserting packets at the lower layers, thereby minimizing the need for re-aligning the packets at the lower layer and minimizing the need for applying backpressure to the higher layer to limit the data transmitted from the higher layer. In some embodiments, the scheduling is based on a request-response protocol between the lower layer and the higher layer, and loss of bandwidth is minimized. In some embodiments, the scheduling function is implemented in the existing logic in the higher layer and can thus be implemented with a relatively small additional cost in terms of hardware (logic) required.

It will be understood that "layer," "layers," or variations thereof as mentioned herein refers to the layers of abstraction of the conceptual models that may be used to describe telecommunication or computing devices. An example of a conceptual model that use layers of abstraction includes the Open Systems Interconnection model (OSI model) for network protocols or PCI (Peripheral Component Interconnect) Express, referred to as PCIe, for connecting components in computers. It will also be understood that actions, such as transmitting a request, receiving a response, scheduling packets, etc., being performed by the different layers disclosed herein are performed by the hardware/software that constitutes the corresponding layer.

For the sake of explanation, embodiments are described with reference to systems that utilize the PCI (Peripheral Component Interconnect) Express architecture for communication. PCIe is a general-purpose architecture defined for interconnecting I/O subsystems to processors. The PCIe architecture uses packet-based communication over high-speed serial links to provide a scalable I/O interconnect architecture for systems ranging from laptop computers to supercomputers. However, embodiments disclosed herein are not limited to the PCIe standard and are equally applicable to all communication standards/protocols that include a multi-layered architecture (e.g., OSI model), without departing from the scope of the disclosure.

FIG. 1 illustrates a point-to-point communications channel. Solely for the sake of explaining scheduling of packets according to example embodiments disclosed herein, the point-to-point communications channel is considered as being implemented based on the PCIe architecture. As shown in FIG. 1, two modules 12 and 14, each including a respective transmit and receive port pair 13 and 15, communicate with each other via a communication link 10. The communication link 10 includes two channels 16 and 18, one in each direction. PCI-Express uses packets to communicate information between modules. The channels 16 and 18 each carry packets 17 and 19 between the components.

Figure 2:
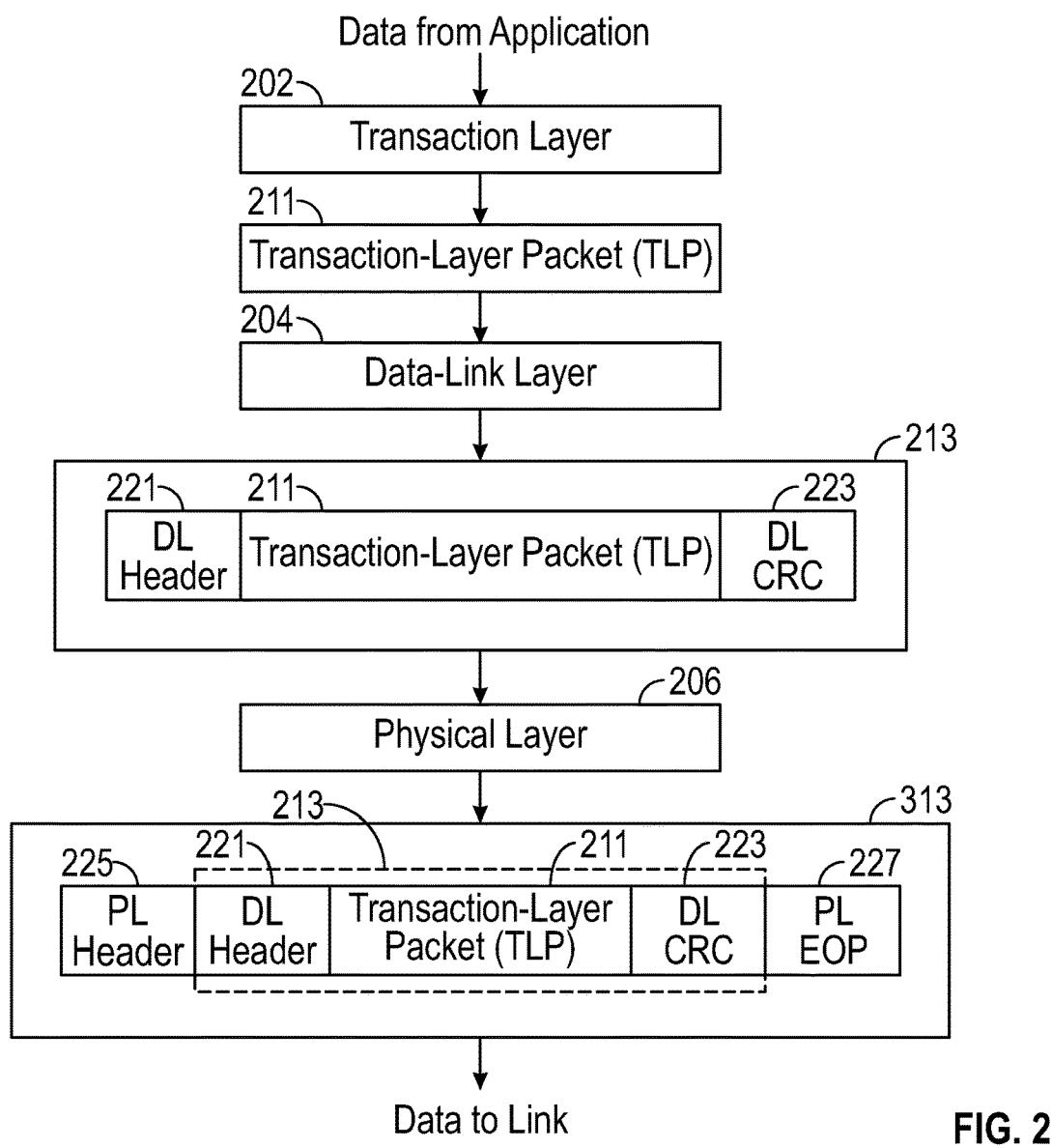
FIG. 2 is a schematic overview of a PCI Express (Peripheral Component Interconnect Express) architecture.

FIG. 2 is a schematic overview of a PCIe architecture. As illustrated, the PCIe architecture is based on a three-layer protocol stack that includes a physical layer 206, a data link layer 204, and a transaction layer 202 (illustrated in increasing order of abstraction). The physical layer 206 defines the technology and electrical specifications of the physical medium, transmission coding, channel bonding mechanisms, methods for striping higher-layer packets across multiple serial links. The data link layer 204 defines the protocols for reliable communication across the link. The transaction layer 202 uses the link provided by the data link layer to support memory and I/O transactions (reads and writes) across the link. Applications use services provided by the transaction layer 202 to access the memory or I/O resources in a remote device.

Packets are formed in the transaction layer 202 and the data link layer 204 to carry the information from the transmitting component to the receiving component. Each layer adds its own header/trailer (or other information) to the incoming packet transmitted by the previous layer and outputs a new packet including the incoming packet and the header/trailer (a process referred to as data encapsulation). For example, as illustrated in FIG. 2, transaction layer 202 transmits a data packet, indicated as transaction layer packet 211, to the data link layer 204. The data link layer 204 adds a header, e.g., illustrated as DL header 221, and a trailer, e.g., illustrated as DL CRC 223, to the transaction layer packet 211, and generates a new data packet including the transaction layer packet 211, the DL header 221, and the DL CRC 223. The new data packet, referred to as data link layer (DLL) data packet 213 (referred to herein as DLL-DP), is output to the physical layer 206. The physical layer 206 adds another header PL header 225 and trailer PL end of packet (EOP) 227 to the incoming DLL-DP 213, and generates a new data packet including the DLL-DP 213, the PL header 225, and PL EOP 227. The new data packet, referred to as physical layer (PL) data packet 313 (referred to herein as PL-DP), is output to one or more links for transmission, e.g., to other modules in the system.

Figure 3:
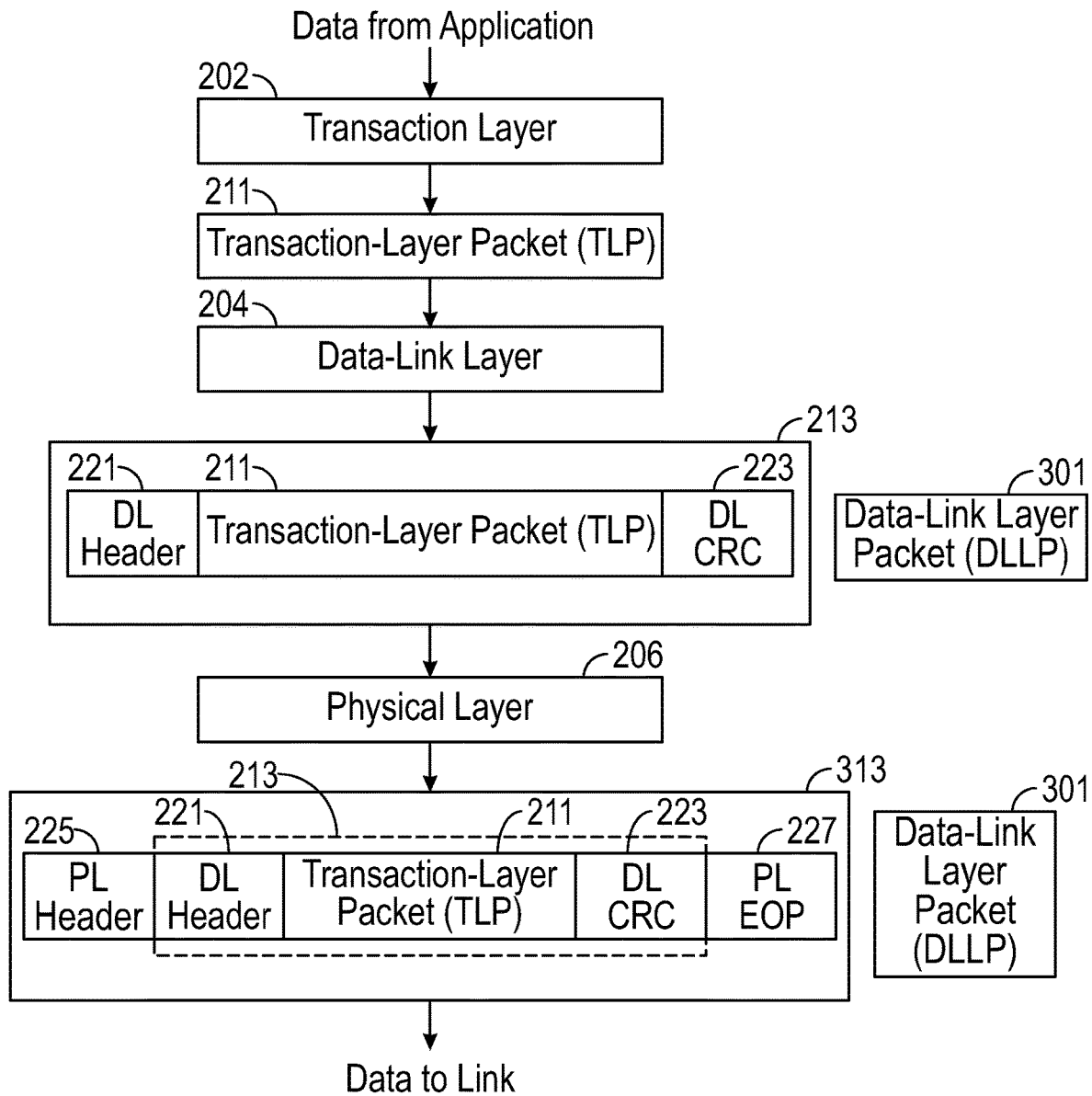
FIG. 3 shows a schematic representation of packet flow through the layers shown in FIG. 2.

In addition to application data, the PCIe links also carry one or more control packets used to communicate control information such as data-link layer acknowledgements, flow control information, link power management information, and the like. FIG. 3 shows a schematic representation of packet flow through the different layers shown in FIG. 2. As illustrated, the data link layer 204 multiplexes a control packet, indicated as data link layer packet (DLLP) 301, with the transaction layer packet 211. The data link layer packet (DLLP) 301 are generated by the data link layer 204 and output along with DLL-DP 213 in the outgoing data stream.

When the data link layer 204 schedules a data link layer packet (DLLP) 301 on its outgoing data stream, the data link layer 204 shifts and re-aligns the DLL-DP 213 and inserts one or more data link layer packets 301 at specific locations in the data stream, and applies backpressure to delay the incoming transaction layer packets 211. In applying backpressure, the data link layer 204 requests the transaction layer 202 (or more specifically, to the logic included in the transaction layer 202) to delay transmission of transaction layer packets 211. In an example, the delay may include a predetermined number of clock cycles.

Figure 4:
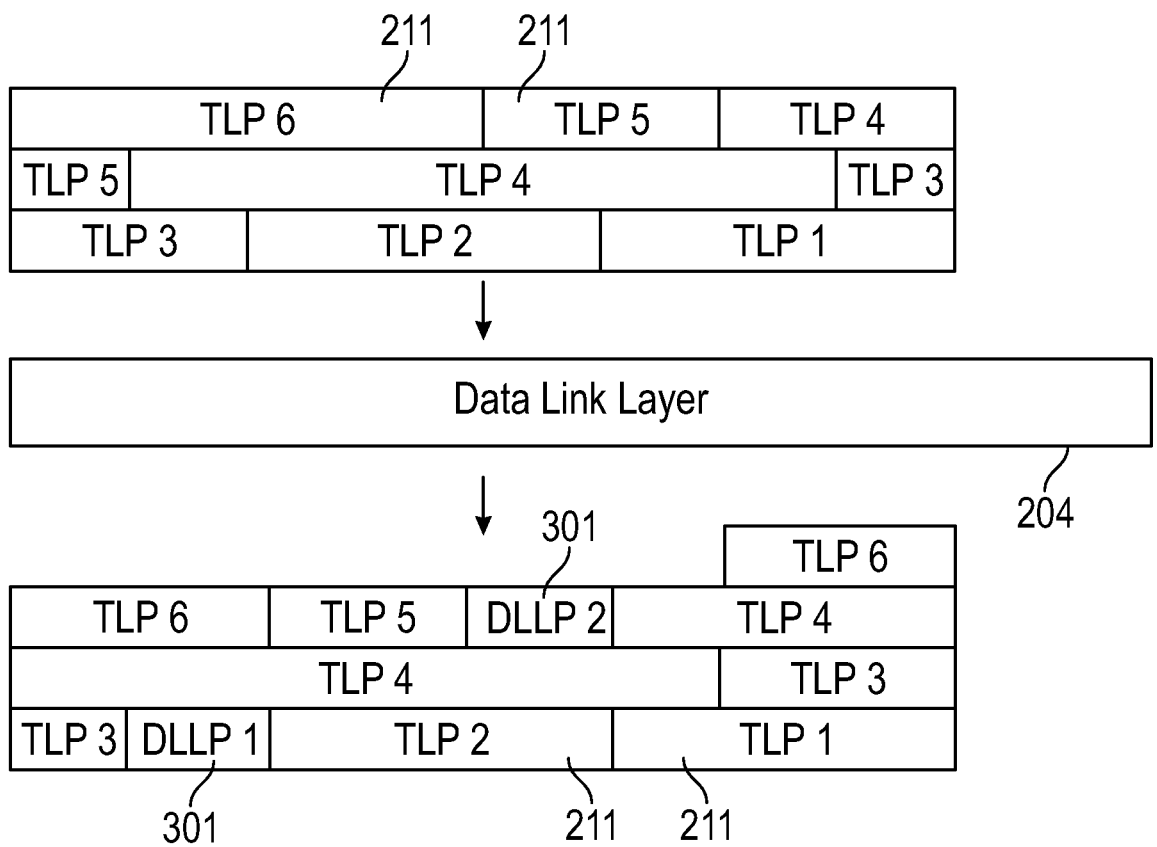
FIG. 4 illustrates packet flow through the data link layer in FIG. 2.

FIG. 4 illustrates packet flow through the data link layer 204. For the sake of clarity of illustration, the DL header 221 and DL CRC 223 are omitted in FIG. 4. Also for the sake of clarity of illustration, only the transaction layer packet 211 portion of the data link layer (DLL) data packet 213 is illustrated. However, it will be understood that the outgoing data stream from the data link layer 204 includes data link layer (DLL) data packets 213 corresponding to the transaction layer packets 211 (TLP1-TLP6) in the input data stream.

The data link layer 204 receives transaction layer packets 211 (indicated as TLP1-TLP6) in the input data stream. The data link layer 204 shifts and re-aligns the transaction layer packets 211 (TLP1-TLP6) to insert the data link layer packets 301 (DLLP1 and DLLP2) at specific locations between the transaction layer packets 211 (TLP1-TLP6). As illustrated, in the outgoing data stream, the data link layer packet DLLP1 is inserted between transaction layer packets TLP2 and TLP3, and the data link layer packet DLLP2 is inserted between transaction layer packets TLP4 and TLP5.

Figure 5:
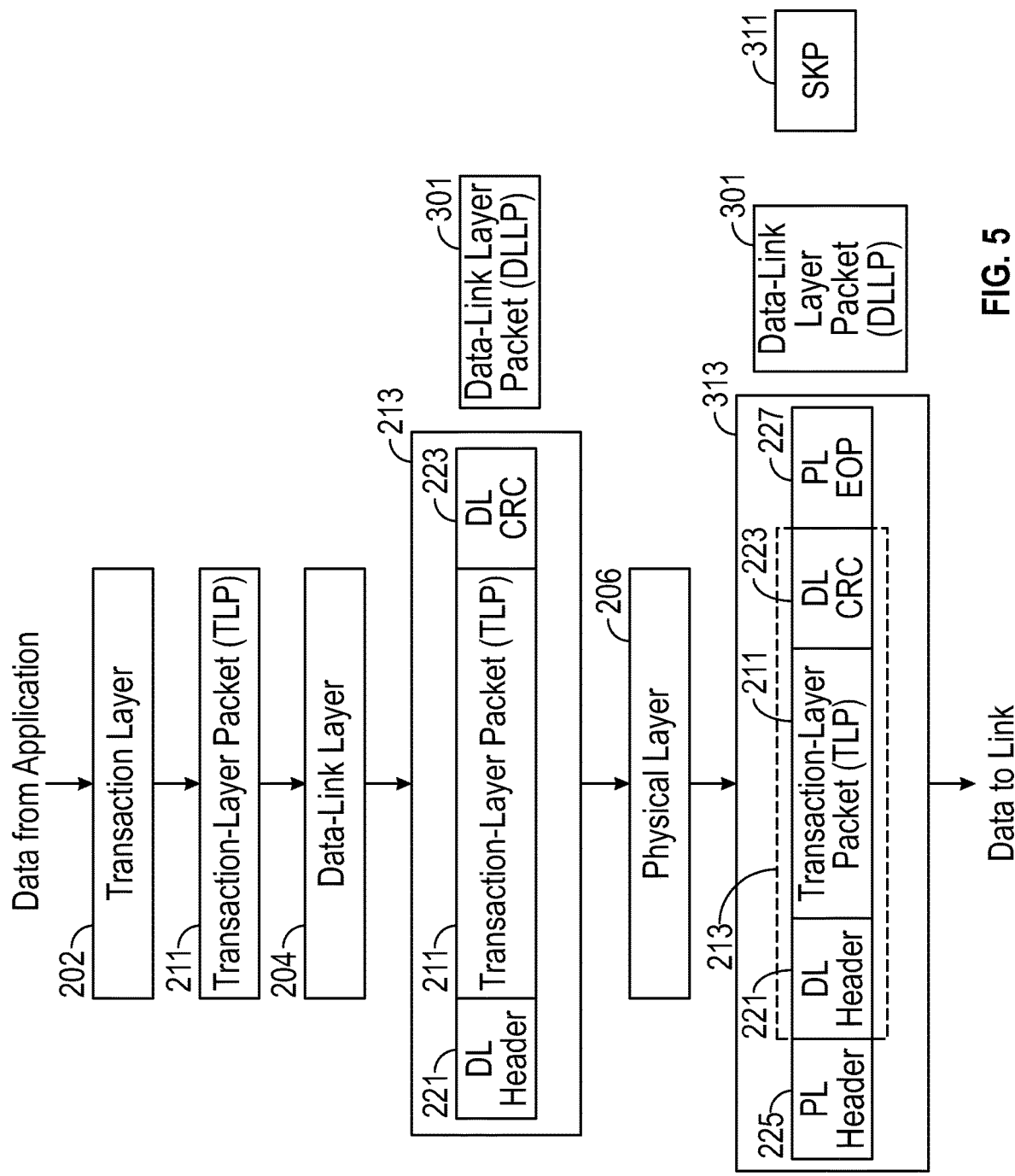
FIG. 5 shows another schematic representation of packet flow through the layers shown in FIG. 2.

In addition to including the header PL header 225 and the trailer PL EOP 227, the physical layer 206 also inserts additional control packets to the outgoing data stream. FIG. 5 shows another schematic representation of packet flow through the layers shown in FIG. 2. The physical layer 206 receives the data stream from the data link layer 204 and generates a control packet and inserts the control packet in the outgoing data stream. The control packet is inserted periodically or at defined intervals in the outgoing data stream. In an embodiment, the control packet is a SKP sequence 311. The SKP sequence 311 is used to minimize data loss when the receiver clock is different from the transmitter clock, and to facilitate alignment of data transmitted between the modules.

When the physical layer 206 schedules a SKP sequence 311 on its outgoing data stream, it applies backpressure to delay the incoming data link layer (DLL) data packets 213 and data link layer packets 301 in order to create space for the SKP sequence 311. In applying backpressure, the physical layer 206 requests to the transaction layer 202 and/or to the data link layer 204 to delay transmission of the transaction layer packets 211, the data link layer (DLL) data packets 213, and/or data link layer packets 301. In an example, the delay may include a one or more clock cycles. In addition to applying backpressure, the physical layer 206 shifts and re-aligns the packets received from the data link layer 204 and inserts one (or more) SKP sequence 311 at specific location in the data stream.

Figure 6:
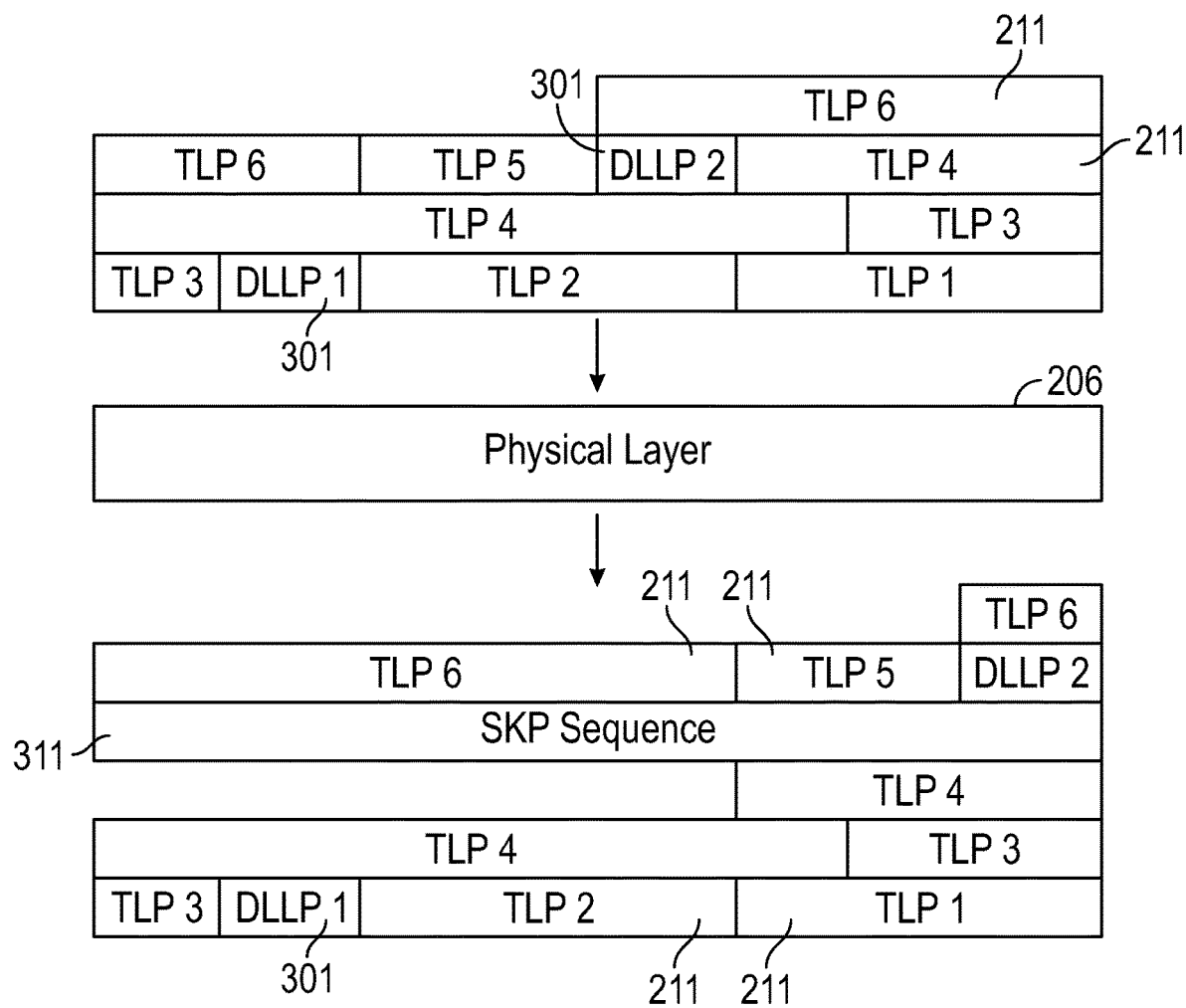
FIG. 6 illustrates packet flow through the physical layer in FIG. 2.

FIG. 6 illustrates packet flow through the physical layer 206. For the sake of clarity of illustration, the DL header 221, PL header 225, DL CRC 223, and PL EOP 227 are omitted in FIG. 6. Also for the sake of clarity of illustration, only the transaction layer packet 211 portion of the physical layer (PL) data packet 313 is illustrated. However, it will be understood that the outgoing data stream from the physical layer 206 includes physical layer (PL) data packet 313 corresponding to the data link layer (DLL) data packets 213 received from the data link layer 204.

The physical layer 206 receives from the data link layer 204 a data stream including transaction layer packets 211 (TLP1-TLP6) and data link layer packets 301 (DLLP1 and DLLP2). The physical layer 206 shifts and re-aligns the transaction layer packets 211 (TLP1-TLP6) and the data link layer packets 301 (DLLP1 and DLLP2) received from the data link layer 204 to insert the SKP sequence 311 at a specific location in the outgoing data stream. As illustrated, in the outgoing data stream, the SKP sequence 311 is inserted between the transaction layer packet TLP4 and the data link layer packet DLLP2.

The shifting and re-alignment of packets increases the number of logic gates (hardware) in alignment circuits implemented in the data link layer 204 and the physical layer 206. The complexity of the alignment circuits increases with the width of the data stream, which can adversely affect their speed. The alignment circuits also increase the power consumption since these circuits switch at the rate at which data flows through the data stream.

In order to minimize the need for shifting and realigning packets at the lower layers, and to minimize backpressure on the incoming data stream, embodiments disclosed are directed to systems and methods for scheduling packets implemented in the higher layer and for inserting a gap or idle cycle in the data stream generated by the higher layer. In some embodiments, the higher layer is the topmost layer. The gap or idle cycle is inserted upon to a request from the corresponding lower layers. The higher layer responds with the location and the cycle (timing) at which the requested gap or idle cycle is provided. The lower layers then insert the corresponding packets or desired data in that corresponding gap or idle cycle. In an embodiment, the gap is created by omitting data bits at one or more desired locations in the data stream. Thus, by excluding data bits, space is generated for the lower layers to insert the corresponding packets or desired data. In an embodiment, the idle cycle is generated by omitting data bits in an entire clock cycle in a data stream. A gap or an idle cycle both indicate an absence of data bits.

Figure 7:
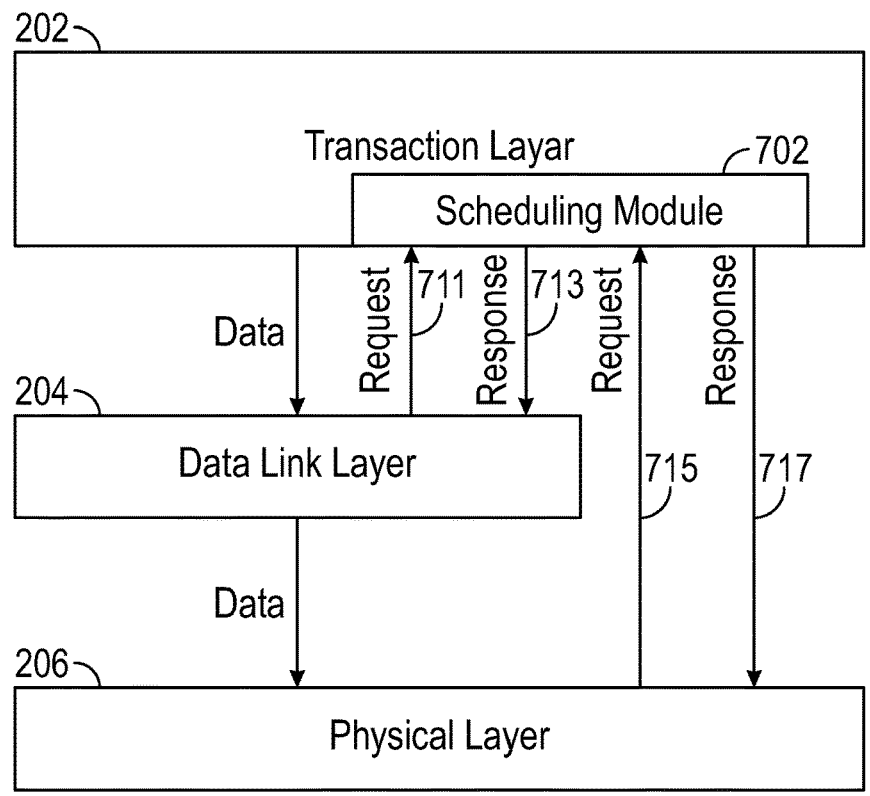
FIG. 7 illustrates a block diagram of a system for scheduling packets, according to example embodiments.

FIG. 7 illustrates a block diagram of a system for scheduling packets, according to example embodiments. As illustrated, the transaction layer 202, which is the topmost layer in the protocol, includes a scheduling module 702. The scheduling module 702 may be implemented in hardware (logic gates) in the transaction layer 202 circuitry that inserts one or more gaps or idle cycles upon request from the corresponding lower layers. In other embodiments, the scheduling module 702 is a firmware (computer readable instructions) that is programmed in the circuitry of the transaction layer 202. In some embodiments, the firmware is programmed (loaded) each time at system startup. In still other embodiments, the scheduling module 702 may be implemented as a combination of hardware and software.

The scheduling module 702 is controlled by a request-response protocol between the transaction layer 202, and the data link layer 204 and the physical layer 206. As illustrated, the data link layer 204 sends a request signal (or simply, a request) 711 to the scheduling module 702 to request the scheduling module 702 to provide one or more gaps in the outgoing data stream for the data link layer 204 for inserting one or more data link layer packets 301. In an embodiment, the request 711 includes widths of the one or more gaps (e.g., in terms of number of bits) required for inserting the one or more data link layer packets 301. In other words, the request 711 includes bandwidth required for inserting the one or more data link layer packets 301. In response, the transaction layer 202 provides the requested number of gaps and communicates via a response signal (or simply, response) 713 the location of each gap in the data stream and the clock cycle (time of occurrence) at which the gap is provided. The data link layer 204 then inserts the desired data link layer packets 301 in provided gaps. Because the gaps are provided in the incoming data stream to the data link layer 301, no shifting or realignment is needed.

Figure 8:
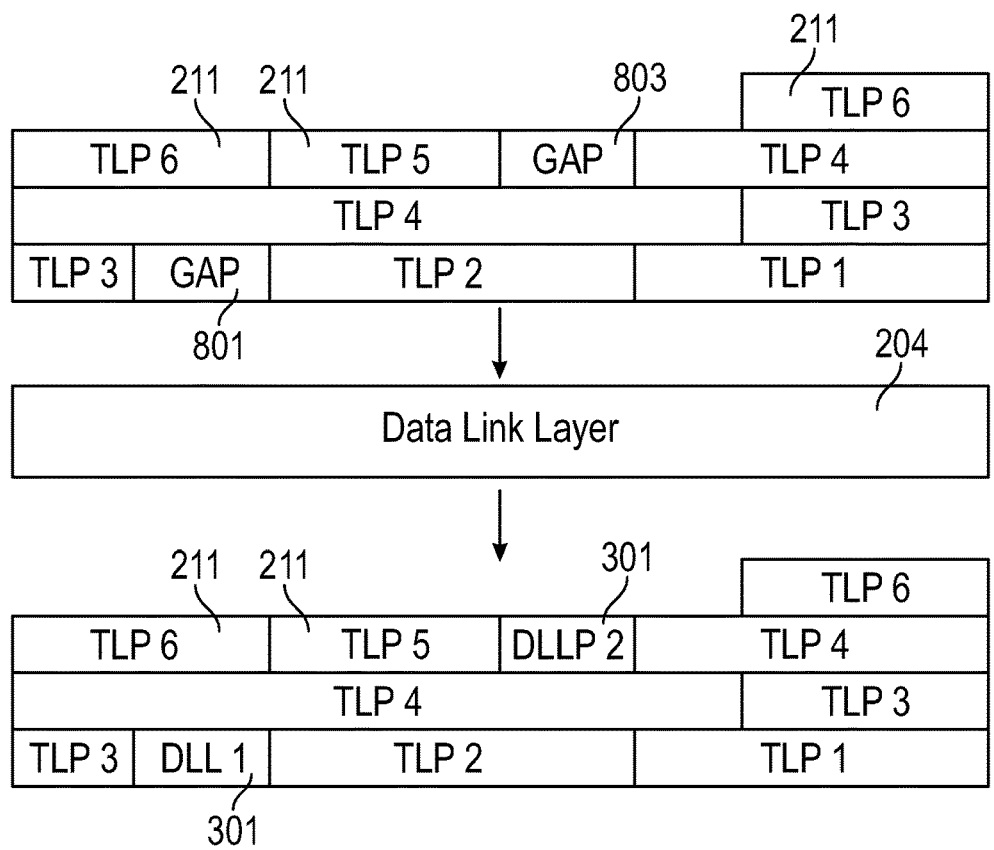
FIG. 8 illustrates the data link layer of FIG. 2 receiving a data stream including transaction layer packets and gaps for inserting the data link layer packets in response to a request from the data link layer.

Referring briefly to FIG. 8, and additionally to FIG. 4, illustrated is the data link layer 204 receiving a data stream including transaction layer packets 211 (TLP1-TLP6) and gaps 801 and 803 for inserting the data link layer packets (DLLP) 301 based on the request 711. The gap 801 is between transaction layer packets TLP2 and TLP3 and gap 803 is between transaction layer packets TLP4 and TLP5. As illustrated, the data link layer 204 inserts the data link layer packet DLLP1 in the gap 801 and inserts the data link layer packet DLLP2 in the gap 803 in the outgoing data stream. It should be noted that a gap may not always be between two transaction layer packets. In some embodiments, a gap can be included before any transaction layer packets are transmitted (e.g., before transaction layer packet TLP1) or can be included after all transaction layer packets have been transmitted (e.g., after transaction layer packet TLP6).

Returning to FIG. 7, the physical layer 206 sends a request 715 to the scheduling module 702 to request the scheduling module 702 to provide an idle cycle in the data stream transmitted to the physical layer 206 for the physical layer 206 to insert a SKP sequence 311. In an embodiment, the request 715 includes width of the idle cycle (e.g., in terms of number of clock cycles) required for inserting the SKP sequence 311. In other words, the request 715 includes bandwidth required for inserting the SKP sequence 311. In response, the transaction layer 202 inserts an idle cycle and communicates via a response 717 the location of the idle cycle in the data stream and the clock cycle (time of occurrence) at which the idle cycle is provided. The physical layer 206 then inserts the desired SKP sequence 311 in provided idle cycle.

Figure 9:
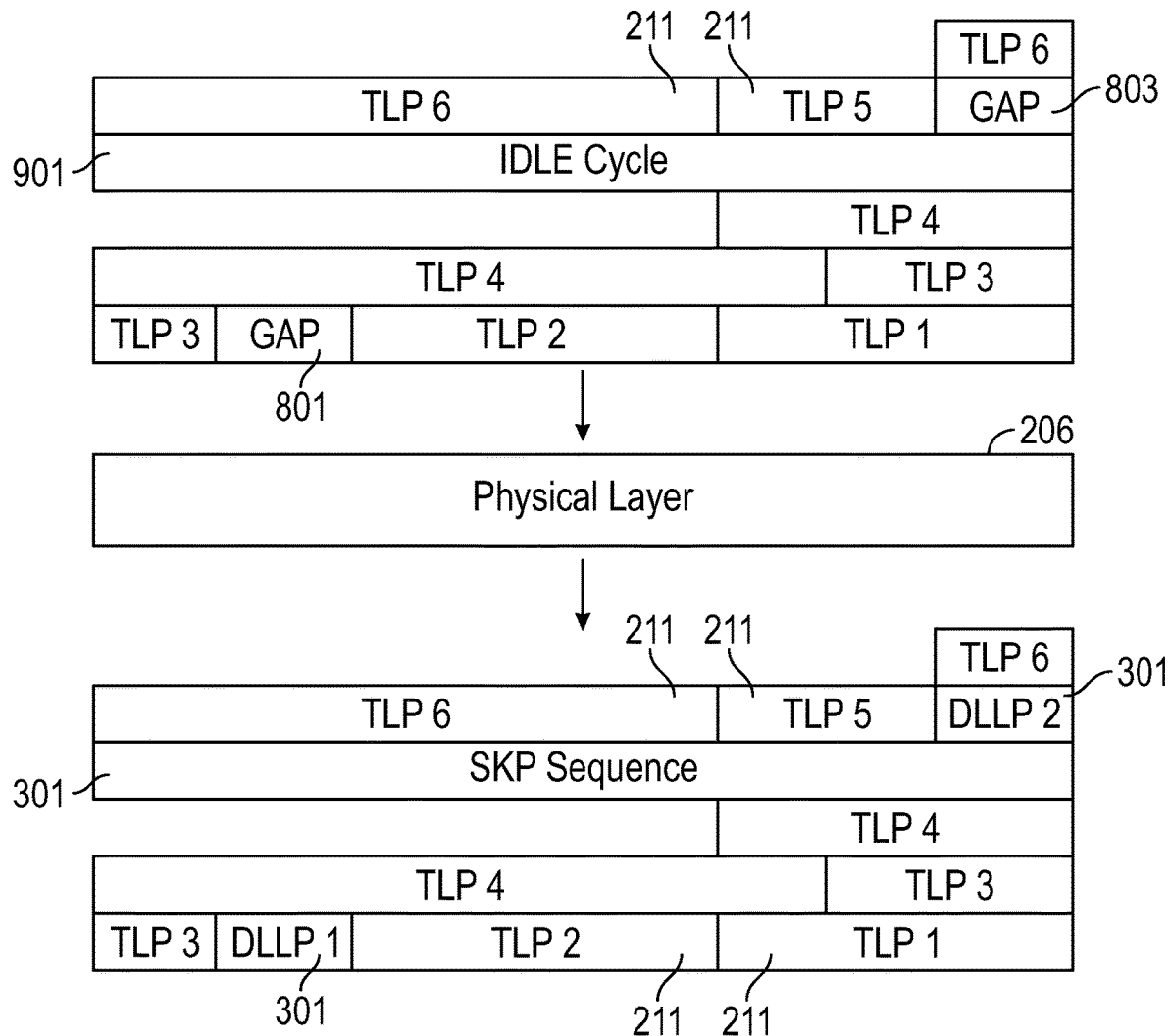
FIG. 9 illustrates the physical layer of FIG. 2 receiving a data stream including transaction layer packets, gaps, and an idle cycle in response to a request from the physical layer.

Referring briefly to FIG. 9, and additionally to FIG. 6, illustrated is the physical layer receiving a data stream from the transaction layer 202 including transaction layer packets 211 (TLP1-TLP6), gaps 801 and 803, and an idle cycle 901 based on the request 715. The idle cycle 901 is between transaction layer packets TLP4 and the data link layer packet DLLP2. As illustrated, the physical layer 206 inserts the SKP sequence 311 in the idle cycle 901. It should be noted that an idle cycle may not always be between two transaction layer packets. In some embodiments, an idle cycle can be included before all transaction layer packets (e.g., before transaction layer packet TLP1) or can be included after all transaction layer packets have been output (e.g., after transaction layer packet TLP6).

It should be noted that FIG. 9 illustrates the data stream as output from the transaction layer 202, and includes gaps 801 and 803 for the data link layer packets DLLP1 and DLLP2 and idle cycle 901 for the SKP sequence 311. However, in other embodiments, the data stream may include either the gaps 801 and 803, or the idle cycle 901, not both, depending on the requests 711 and 715. For instance, if the physical layer 206 sends a request 715 for an idle cycle, and the data link layer 204 does not send a request 711 for a gap 801 (or 803), then the transaction layer 202 may output a data stream that includes an idle cycle 901, but not the gap 801 (or 803). Although FIG. 9 illustrates a single idle cycle 901, embodiments are not limited in this regard. The physical layer 206 may request for two or more idle cycles depending on the number of SKP sequences to be inserted. For instance, two idle cycles may be requested if two SKP sequences are to be inserted. The idle cycles may be either consecutive or separated from each other.

Embodiments disclosed herein provide many advantages over existing systems for packet scheduling. For instance, the system according to example embodiments consolidates the data stream shifts and alignments in a single layer, typically the topmost layer (the transaction layer in this case), and eliminates the replication of this logic in lower layers by looking ahead to the data insertion requests from lower layers. By eliminating the logic from the lower layers, the hardware in the lower layers is simplified. This reduces the power consumption and increases the operational speed by reducing the logic complexity.

Figure 10:
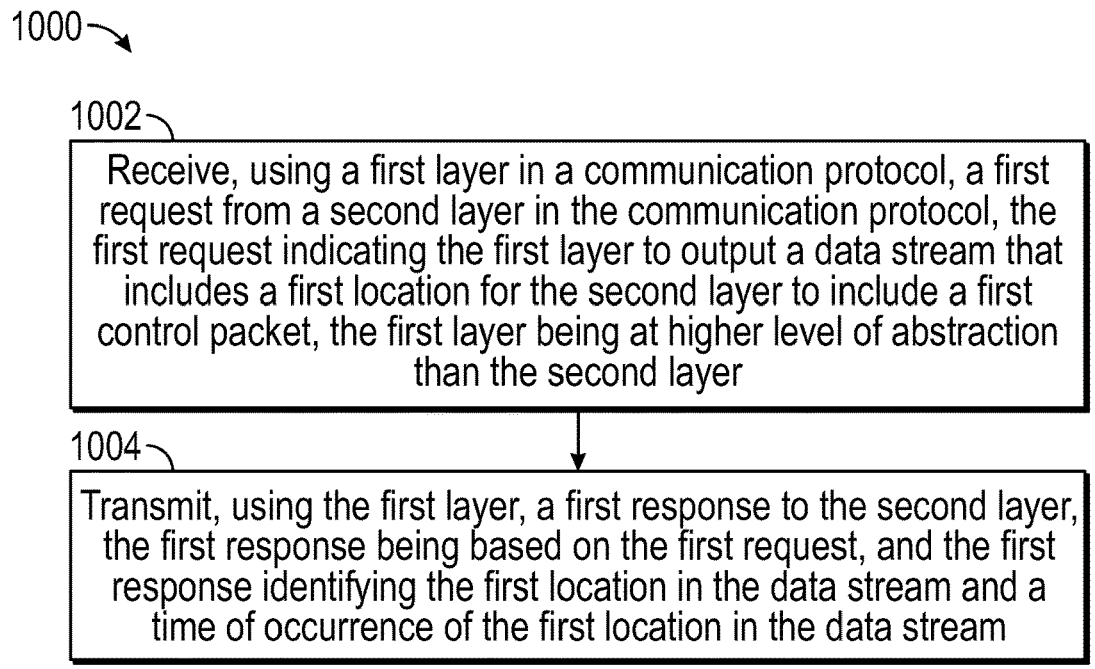
FIG. 10 is a flowchart including steps in a method for scheduling packets, according to some embodiments.

FIG. 10 is a flowchart including steps in a method 1000 for scheduling packets, according to some embodiments. Method 1000 may be performed at least partially by the computing device 1100 (See below, FIG. 11). Methods consistent with the present disclosure may include at least some, but not all, of the steps illustrated in method 1000, performed in a different sequence. Furthermore, methods consistent with the present disclosure may include at least two or more steps as in method 1000 performed overlapping in time, or almost simultaneously.

Operation 1002 includes receiving, using a first layer in a communication protocol, a first request from a second layer in the communication protocol. The first request indicates the first layer to output a data stream that includes a first location for the second layer to include a first control packet, and the first layer is at a higher level of abstraction than the second layer.

Operation 1004 includes transmitting, using the first layer, a first response to the second layer. The first response is based on the first request, and the first response identifies the first location in the data stream and a time of occurrence of the first location in the data stream.

Figure 11:
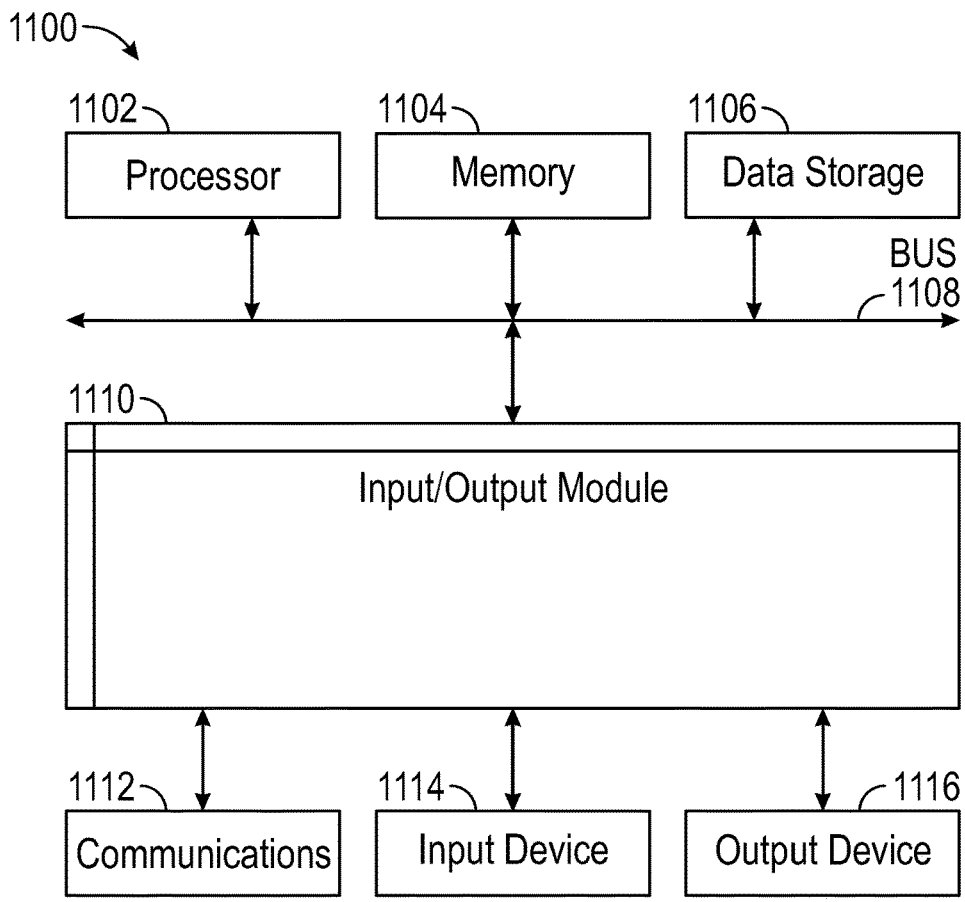
FIG. 11 is a block diagram illustrating an example computing device for controlling an operation of the system for scheduling packets illustrated in FIG. 7, according to some embodiments.

FIG. 11 is a block diagram illustrating an example computing device 1100 for controlling an operation of the system for scheduling packets illustrated in FIG. 7, according to some embodiments. For example, the computing device 1100 may control the operations of the components forming the transaction layer 202, the scheduling module 702, the data link layer 204, and/or the physical layer 206. In certain aspects, computing device 1100 can be implemented using hardware or a combination of software and hardware, either in a dedicated server, integrated into another entity, or distributed across multiple entities.

Computing device 1100 includes a bus 1108 or other communication mechanism for communicating information, and a processor 1102 coupled with bus 1108 for processing information. By way of example, computing device 1100 can be implemented with one or more processors 1102. Processor 1102 can be a general-purpose microprocessor, a microcontroller, a Digital Signal Processor (DSP), an Application Specific Integrated Circuit (ASIC), a Field-Programmable Gate Array (FPGA), a Programmable Logic Device (PLD), a controller, a state machine, gated logic, discrete hardware components, or any other suitable entity that can perform calculations or other manipulations of information.

Computing device 1100 includes, in addition to hardware, code that creates an execution environment for the computer program in question, e.g., code that constitutes processor firmware, a protocol stack, a database management system, an operating system, or a combination of one or more of them stored in an included memory 1104, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. Processor 1102 and memory 1104 can be supplemented by, or incorporated in, special purpose logic circuitry.

The instructions may be stored in memory 1104 and implemented in one or more computer program products, e.g., one or more modules of computer program instructions encoded on a computer-readable medium for execution by, or to control the operation of, the computing device 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NETLIST), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and WL-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computing device 1100 further includes a data storage device 1106 such as a magnetic disk or optical disk, coupled to bus 1108 for storing information and instructions.

Computing device 1100 is coupled via input/output module 1110 to various devices. The input/output module 1110 is any input/output module. Example input/output modules 1110 include data ports such as USB ports. The input/output module 1110 is configured to connect to a communications module 1112. Example communications modules 1112 include networking interface cards, such as Ethernet cards and modems. In certain aspects, the input/output module 1110 is configured to connect to a plurality of devices, such as an input device 1114 and/or an output device 1116. Example input devices 1114 include a keyboard and a pointing device, e.g., a mouse or a trackball, by which a user can provide input to the computing device 1100. Other kinds of input devices 1114 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1116 include display devices, such as an LED (light emitting diode), CRT (cathode ray tube), or LCD (liquid crystal display) screen, for displaying information to the user.

System for scheduling packets according to embodiments disclosed may be controlled by computing device 1100 in response to processor 1102 executing one or more sequences of one or more instructions contained in memory 1104. Such instructions may be read into memory 1104 from another machine-readable medium, such as data storage device 1106. Execution of the sequences of instructions contained in memory 1104 causes processor 1102 to control the system in FIG. 7 for scheduling packets. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing device that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., Ethernet switch, and the like. For example, some aspects of the subject matter described in this specification may be performed on a cloud-computing environment. Accordingly, in certain aspects, a user of systems and circuits as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing device 1100 includes servers and personal computer devices. A personal computing device and server are generally remote from each other and typically interact through a communication network. The relationship of client and server arises by virtue of computer programs running on the respective computers and having a client-server relationship to each other. Computing device 1100 can be, for example, and without limitation, a desktop computer, laptop computer, or tablet computer. Computing device 1100 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1102 for execution. Such a medium may take many forms, including, but not limited to, non-volatile media, volatile media, and transmission media. Non-volatile media include, for example, optical disks, magnetic disks, or flash memory, such as data storage device 1106. Volatile media include dynamic memory, such as memory 1104. Transmission media include coaxial cables, copper wire, and fiber optics, including the wires that comprise bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
   receiving, at a first layer of a communication protocol, a first scheduling request from a second layer of the communication protocol,
   wherein the first scheduling request comprises a request to the first layer to delay transmission of one or more packets output in a data stream to the second layer to create a gap at a first location, the gap at a first location is for the second layer to include a first control packet, and
   the first layer being at a higher level of abstraction than the second layer; and
   transmitting, at the first layer, a first scheduling response to the second layer, the first scheduling response identifying the gap at the first location in the data stream to the second layer and a time of occurrence of the gap at the first location in the data stream to the second layer, wherein the second layer inserts a packet created at the second layer in the gap at the first location.

2. The method of claim 1, wherein the first layer is a topmost transaction layer of a plurality of abstraction layers and the second layer is a datalink layer in the communication protocol.

3. The method of claim 1, further comprising:
   receiving, using the first layer, a second scheduling request from a third layer in the communication protocol,
   wherein the second scheduling request comprises a request to the first layer to delay transmission of one or more packets output in a data stream to create a second gap at a second location for the third layer to include a second control packet, and
   the third layer being at a lower level of abstraction than the first layer; and
   transmitting, at the first layer, a second scheduling response to the third layer, the second scheduling response identifying the second gap at the second location in the data stream and a time of occurrence of the second gap at the second location in the data stream to the second layer, wherein the third layer inserts a packet created at the third layer in the second gap at the second location.

4. The method of claim 3, wherein the first and second locations correspond to an absence of one or more data bits in the data stream.

5. The method of claim 3, wherein the first layer includes a scheduling module, and the method further comprises:
   receiving the first and second scheduling requests using the scheduling module; and
   transmitting the first and second scheduling responses using the scheduling module.

6. The method of claim 3, wherein the data stream includes a plurality of data packets and corresponding gaps are included between respective data packets.

7. The method of claim 3, wherein the first layer is the topmost transaction layer, and the third layer is a physical layer of a plurality of abstraction layers in the communication protocol.

8. The method of claim 1, wherein the communication protocol is implemented in PCI (Peripheral Component Interconnect) Express architecture.

9. An assembly, comprising
   a system including a first layer and a second layer,
   wherein the first and second layers are different layers of abstraction of a communication protocol utilized by the system, the first layer includes a scheduling module, and first layer is at a higher level of abstraction than the second layer;
   a memory device storing instructions; and
   a processor communicably coupled to the system and configured to execute the instructions to direct the system to:
   receive, at the scheduling module of the first layer, a first scheduling request from the second layer,
   wherein the first scheduling request comprises a request to the first layer to delay transmission of one or more packets output in a data stream to the second layer to create a gap at a first location, the gap at a first location is for the second layer to include a first control packet, and
   transmit, using the scheduling module of the first layer, a first scheduling response to the second layer, the first scheduling response identifying the gap at the first location in the data stream to the second layer and a time of occurrence of the gap at the first location in the data stream to the second layer, wherein the second layer inserts a packet created at the second layer in the gap at the first location.

10. The assembly of claim 9, wherein the first layer is a topmost transaction layer of a plurality of abstraction layers and the second layer is a datalink layer in the communication protocol.

11. The assembly of claim 9, wherein the system is further directed to:
    receive, using the scheduling module of the first layer, a second scheduling request from a third layer in the communication protocol,
    wherein the second scheduling request comprises a request to the first layer to delay transmission of one or more packets output in a data stream to create a second gap at a second location for the third layer to include a second control packet, and
    the third layer being at a lower level of abstraction than the first layer; and
    transmit, at the scheduling module of the first layer, a second scheduling response to the third layer, the second scheduling response identifying the second gap at the second location in the data stream and a time of occurrence of the second gap at the second location in the data stream to the second layer, wherein the third layer inserts a packet created at the third layer in the second gap at the second location.

12. The assembly of claim 11, wherein the first and second locations correspond to an absence of one or more data bits in the data stream.

13. The assembly of claim 11, wherein the data stream includes a plurality of data packets and the second location is included between two data packets.

14. The assembly of claim 9, wherein the data stream includes a plurality of data packets and corresponding gaps are included between respective data packets.

15. The assembly of claim 11, wherein the first layer is the topmost transaction layer, and the third layer is a physical layer of a plurality of abstraction layers in the communication protocol.

16. The assembly of claim 9, wherein the system is based on PCI (Peripheral Component Interconnect) Express architecture.

17. A non-transitory, computer-readable medium storing instructions which, when executed by a processor, direct the processor communicably connected to a system to perform a set of acts, the system including a first layer and a second layer, and the first layer including a scheduling module, the set of acts comprising:

receiving, at the scheduling module, a first scheduling request from the second layer, wherein the first scheduling request comprises a request to the first layer to delay transmission of one or more packets output in a data stream to the second layer to create a gap at a first location, the gap at a first location is for the second layer to include a first control packet, and the first and second layers are different layers of abstraction of a communication protocol used by the system; and transmitting, using the scheduling module, a first scheduling response to the second layer, the first scheduling response identifying the gap at the first location in the data stream to the second layer and a time of occurrence of the gap at the first location in the data stream to the second layer, wherein the second layer inserts a packet created at the second layer in the gap at the first location.

18. The non-transitory, computer-readable medium of claim 17, wherein the system includes a third layer and the set of acts further comprise:

receiving, at the scheduling module, a second scheduling request from the third layer, wherein the second scheduling request comprises a request to the first layer to delay transmission of one or more packets output in a data stream to create a second gap at a second location for the third layer to include a second control packet; and transmitting, at the scheduling module, a second scheduling response to the third layer, the second scheduling response identifying the second gap at the second location in the data stream and a time of occurrence of the second gap at the second location in the data stream to the second layer, wherein the third layer inserts a packet created at the third layer in the second gap at the second location.

19. The non-transitory, computer-readable medium of claim 18, wherein the first location and the second location each correspond to an absence of one or more data bits in the data stream and the set of acts further comprise:

outputting the data stream including a plurality of data packets and including the first and second locations between two data packets.

20. The non-transitory, computer-readable medium of claim 18, wherein the first layer is the topmost transaction layer, and the third layer is a physical layer of a plurality of abstraction layers in the communication protocol.

21. The non-transitory, computer-readable medium of claim 17, wherein the first layer is a topmost transaction layer of a plurality of abstraction layers and the second layer is a datalink layer in the communication protocol.

22. The non-transitory, computer-readable medium of claim 17, wherein the system is based on PCI (Peripheral Component Interconnect) Express architecture.

23. The non-transitory, computer-readable medium of claim 17, wherein scheduling module is in the first layer.

* * * * *